United States Patent
Zinsky

(10) Patent No.: US 10,683,975 B2
(45) Date of Patent: Jun. 16, 2020

(54) LIGHTING FIXTURE

(71) Applicant: Marla Zinsky, Jerome, ID (US)

(72) Inventor: Marla Zinsky, Jerome, ID (US)

(*) Notice: Subject to any disclaimer, the term of this patent is extended or adjusted under 35 U.S.C. 154(b) by 0 days.

(21) Appl. No.: 16/403,562

(22) Filed: May 5, 2019

(65) Prior Publication Data
US 2019/0338902 A1 Nov. 7, 2019

Related U.S. Application Data

(60) Provisional application No. 62/667,555, filed on May 6, 2018.

(51) Int. Cl.
| | | |
|---|---|---|
| *F21L 21/00* | (2006.01) | |
| *F21S 6/00* | (2006.01) | |
| *F21S 9/03* | (2006.01) | |
| *F21V 21/08* | (2006.01) | |
| *F21W 121/00* | (2006.01) | |
| *F21W 131/10* | (2006.01) | |
| *F21Y 115/10* | (2016.01) | |

(52) U.S. Cl.
CPC ............. *F21S 6/004* (2013.01); *F21S 9/035* (2013.01); *F21V 21/0824* (2013.01); *F21W 2121/00* (2013.01); *F21W 2131/10* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 1,819,733 A * | 8/1931 | Castelli | ............... | F21L 17/00 362/431 |
| 5,280,417 A * | 1/1994 | Hall | ............... | F21S 8/081 362/640 |
| 5,367,442 A * | 11/1994 | Frost | ............... | F21S 8/081 136/291 |
| 2006/0012978 A1* | 1/2006 | Allsop | ............... | F21S 6/004 362/183 |
| 2017/0219176 A1* | 8/2017 | Chang | ............... | A63H 27/10 |

* cited by examiner

*Primary Examiner* — Vip Patel
(74) *Attorney, Agent, or Firm* — Patent Yogi LLC; Dhiraj Jindal

(57) ABSTRACT

Disclosed herein is a lighting fixture. Accordingly, the lighting fixture may include a vertical pole having a hollow cylindrical section with a top end and a bottom end. Further, the top end of the vertical pole may include inner-hose threads on an inner surface of the vertical pole. Further, the bottom end of the vertical pole may be attached to a staking structure for positioning the vertical pole above a ground surface. Further, the lighting structure may include a solar panel attached to the vertical pole through a fixing mechanism. Further, the solar panel may be electrically coupled with an energy storage device through a controller. Further, the lighting structure may include at least one illuminating device disposed within the hollow cylindrical section of the vertical pole. Further, the lighting structure may include a decorative fixture that may include a hose connector at a lower end of the decorative fixture.

20 Claims, 8 Drawing Sheets

LIGHTING FIXTURE

RELATED APPLICATION(S)

Under provisions of 35 U.S.C. § 119e, the Applicant(s) claim the benefit of U.S. provisional application No. 62/667,555, titled "Seasonal decorative yard lights", filed on May 6, 2018 which is incorporated herein by reference.

TECHNICAL FIELD

Generally, the present disclosure relates to the field of lighting. More specifically, the present disclosure relates to lighting fixtures.

BACKGROUND

Millions of homeowners have found it convenient and helpful to provide outdoor lights lining the edge of a sidewalk or driveway. The most popular outdoor lights provide a solar panel which charges a battery, and a low-powered light which is activated at sunset and deactivated at sunrise. This provides sufficient light to navigate the sidewalk or driveway without being obtrusive. However, conventional outdoor lights are not equipped with removable/changeable decorative elements. A decorative element for such outdoor lights can provide an opportunity for homeowners to celebrate seasonal holidays, show their support for their favorite sports teams, and express many other messages.

Therefore, there is a need for a lighting fixture that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a lighting fixture, in accordance with some embodiments. Accordingly, the lighting fixture may include a vertical pole having a hollow cylindrical section with a top end and a bottom end. Further, the top end of the vertical pole may include inner-hose threads on an inner surface of the vertical pole. Further, the bottom end of the vertical pole may be attached to a staking structure for positioning the vertical pole above a ground surface. Further, the lighting structure may include a solar panel attached to the vertical pole through a fixing mechanism. Further, the solar panel may be electrically coupled with an energy storage device through a controller. Further, the energy storage device and the controller may be secured within the vertical pole. Further, the controller may be configured to allow a flow of electrical energy from the solar panel to the energy storage device when electromagnetic radiation may hit the solar panel. Further, the lighting structure may include at least one illuminating device disposed within the hollow cylindrical section of the vertical pole. Further, the at least one illuminating device may be electrically coupled with the energy storage device through the controller. Further, the controller may be configured to allow the flow of electrical energy from the energy storage device to the at least one illuminating device when at least one of a voltage and a current produced by the solar panel falls below a predefined level. Further, the lighting structure may include a decorative fixture that may include a hose connector at a lower end of the decorative fixture. Further, the hose connector, in an instance, may be a cylindrical section substantially equal in diameter to that of the hollow cylindrical section of the vertical pole. Further, the hose connector may include screw threads on an outer surface of the cylindrical section. Further, the screw threads may be configured to removably connect the decorative fixture with the inner-hose threads of the vertical pole.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
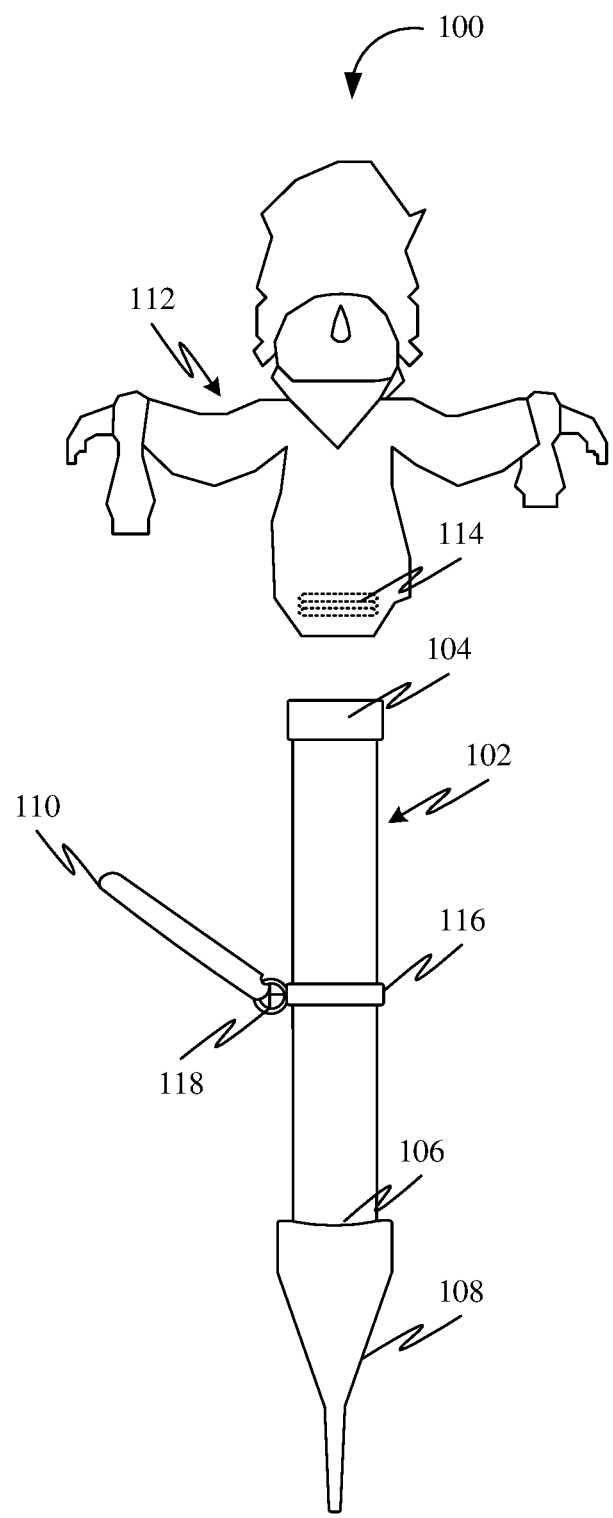
FIG. 1 is a front view of a lighting fixture, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of lighting fixture, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Figure 6:
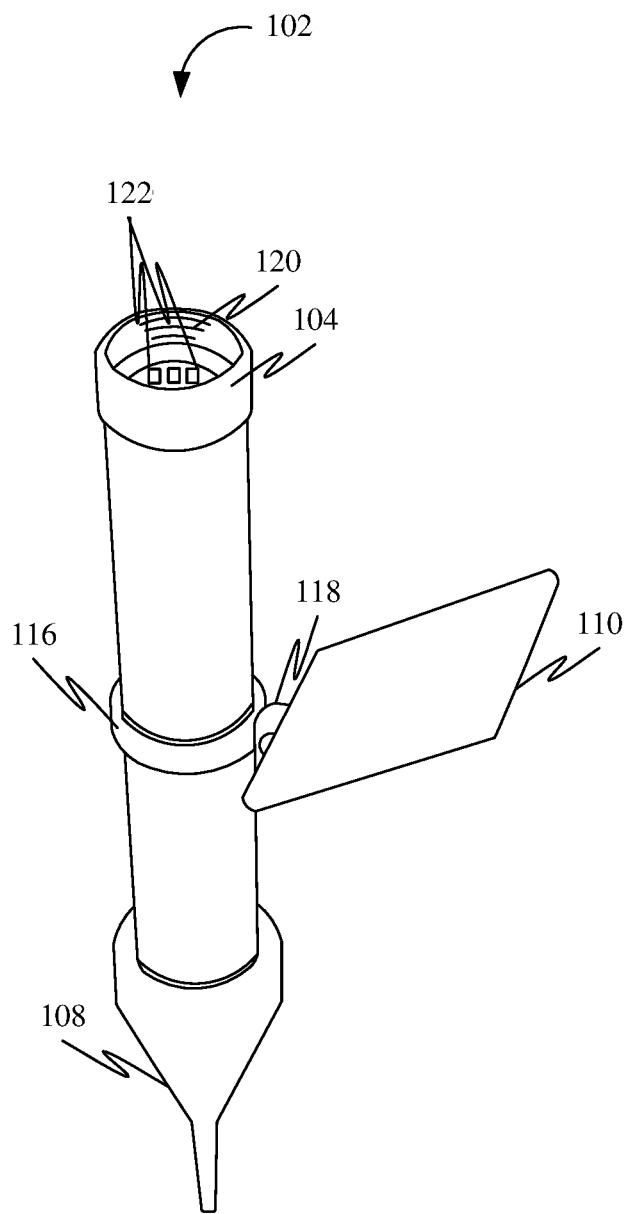
FIG. 6 is a top perspective view of a vertical pole of a light fixture, in accordance with some embodiments.
Figure 7:
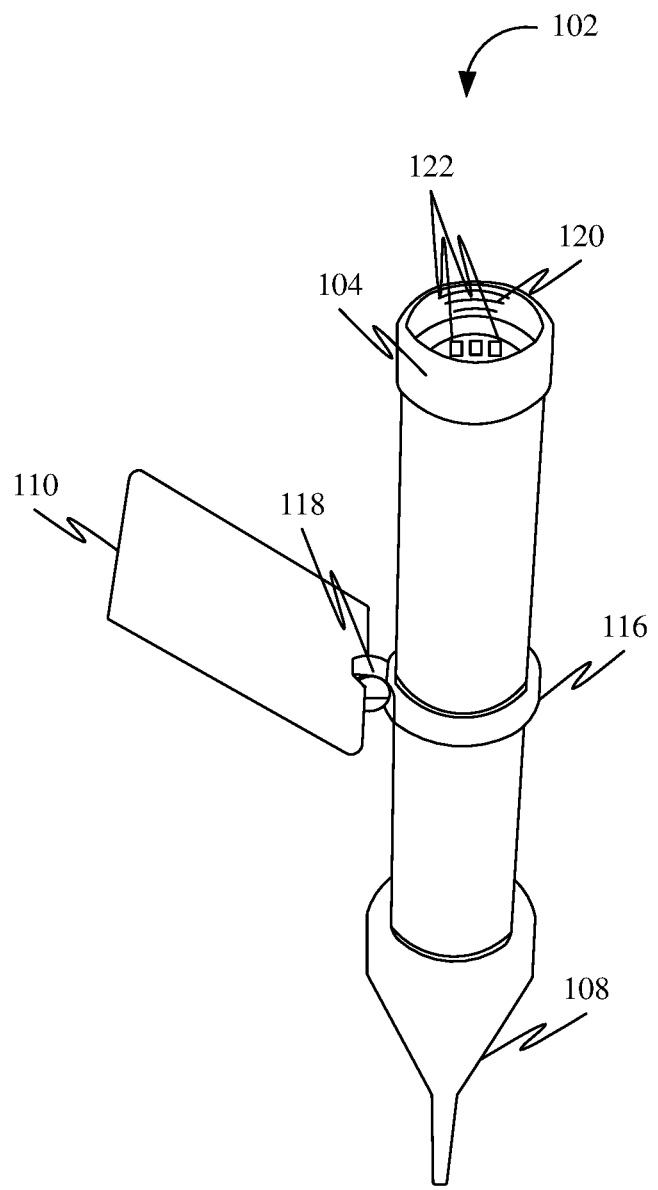
FIG. 7 is an exemplary top perspective view of a vertical pole of a light fixture, in accordance with some embodiments.

FIG. 1 is a front view of a lighting fixture 100, in accordance with some embodiments. Accordingly, the lighting fixture 100 may include a vertical pole 102 having a hollow cylindrical section with a top end 104 and a bottom end 106. Further, the top end 104 of the vertical pole 102 may include inner-hose threads 120 (as shown in FIG. 6 and FIG. 7) on an inner surface of the vertical pole 102. Further, the bottom end 106 of the vertical pole 102 may be attached to a staking structure 108 for positioning the vertical pole 102 above a ground surface. Further, in some embodiments, the staking structure 108 may be a generally elongate structure having a pointed end at a first end and a circular end at a second end. Further, the second end may be adapted to engage with the bottom end 106 of the hollow cylindrical section of the vertical pole 102. Further, the first end may be adapted to be driven into the ground surface for positioning the vertical pole 102 above the ground surface.

Further, the lighting fixture 100 may include a solar panel 110 attached to the vertical pole 102 through a fixing mechanism. Further, the solar panel 110 may be electrically coupled with an energy storage device (not shown) through a controller (not shown). Further, the energy storage device and the controller may be secured within the vertical pole 102. Further, the controller may be configured to allow a flow of electrical energy from the solar panel 110 to the energy storage device when electromagnetic radiation may hit the solar panel 110. Further the electromagnetic radiation, in an instance, may include solar radiations (from sunlight). Further, in some embodiments, the energy storage device may include at least one of a Lithium-ion battery, a Nickel-Cadmium battery, a Lead-Acid battery, and a Nickel-Metal hydride battery. Further, in some embodiments, the solar panel 110 may be manufactured from a silicon wafer framed by a rigid material. Further, the rigid material may include at least one of a steel, a brass, a plastic, and an aluminum alloy.

Further, the lighting fixture 100 may include at least one illuminating device 122 (as shown in FIG. 6 and FIG. 7) disposed within the hollow cylindrical section of the vertical pole 102. Further, the at least one illuminating device 122 may be electrically coupled with the energy storage device through the controller. Further, the controller may be configured to allow the flow of electrical energy from the energy storage device to the at least one illuminating device 122 when at least one of a voltage and a current produced by the solar panel 110 may fall below a predefined level. Further, in some embodiments, the predefined level may be a minimum magnitude of at least one of the voltage and the current that may be required to operate the at least one illuminating device 122. Further, in some embodiments, the at least one illuminating device 122 may include at least one of a Light Emitting Device (LED), a fluorescent lamp, a compact fluorescent lamp, a sodium lamp, and an incandescent light bulb. Further, in some embodiments, the at least one illuminating device 122 may be positioned near the top end 104 of the vertical pole 102.

Further, the lighting fixture 100 may include a decorative fixture 112 that may include a hose connector at a lower end of the decorative fixture 112. Further, the hose connector, in an instance, may be a cylindrical section substantially equal in diameter to that of the hollow cylindrical section of the vertical pole 102. Further, the hose connector may include screw threads 114 on an outer surface of the cylindrical section. Further, the screw threads 114 may be configured to removably connect the decorative fixture 112 with the inner-hose threads 120 of the vertical pole 102. Further, in some embodiments, the decorative fixture 112 may be a light diffuser which diffuses light rays coming from the at least one illuminating device 122. Further, the light diffuser, in an instance, may have a light transmission in a range from transparent to translucent. Further, in some embodiments, a shape of the decorative fixture 112 may correspond to at least one of a shape of a fictional character, a shape of a festival decoration (e.g. Christmas and Halloween decorations), a shape of a seasonal decoration (e.g. spring and summer decorations), and a shape related to a sports team (e.g. a football team).

Further, in some embodiments, the fixing mechanism may include a ring 116 and a holding clamp 118. Further, the holding clamp 118 may be attached to an outer circumference of the ring 116. Further, the holding clamp 118, in an instance, may hold the solar panel 110 in a fixed position. Further, the holding clamp 118, in an instance, may be configured to be moved, allowing a user to adjust position of the solar panel 110. Further, an inner circumference of the ring 116 may be attached with an outer surface of the vertical pole 102. Further, in some embodiments, the ring 116 may be affixed to the vertical pole 102 near the center of the vertical pole 102.

Further, in some embodiments, the vertical pole 102 may be 12 inches in length and the staking structure 108 may be 4 inches in length.

Further, in some embodiments, each of the vertical pole 102, the staking structure 108, the fixing mechanism, and the decorative fixture 112 may be manufactured from at least one of a steel, a brass, a plastic, and an aluminum alloy.

Figure 2:
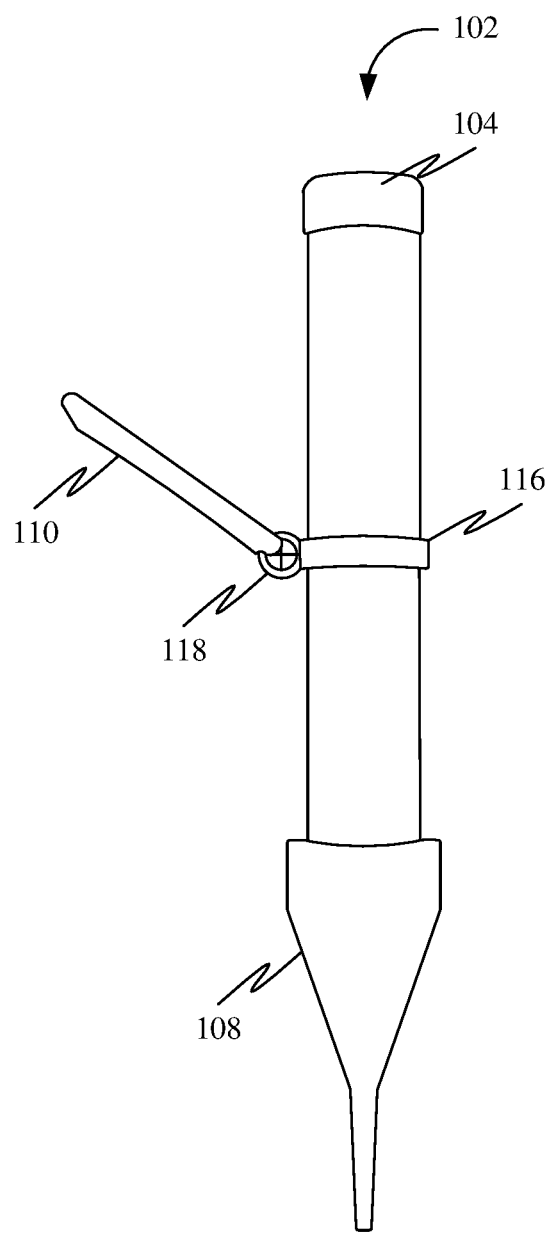
FIG. 2 is a front view of a vertical pole of a light fixture, in accordance with some embodiments.
Figure 3:
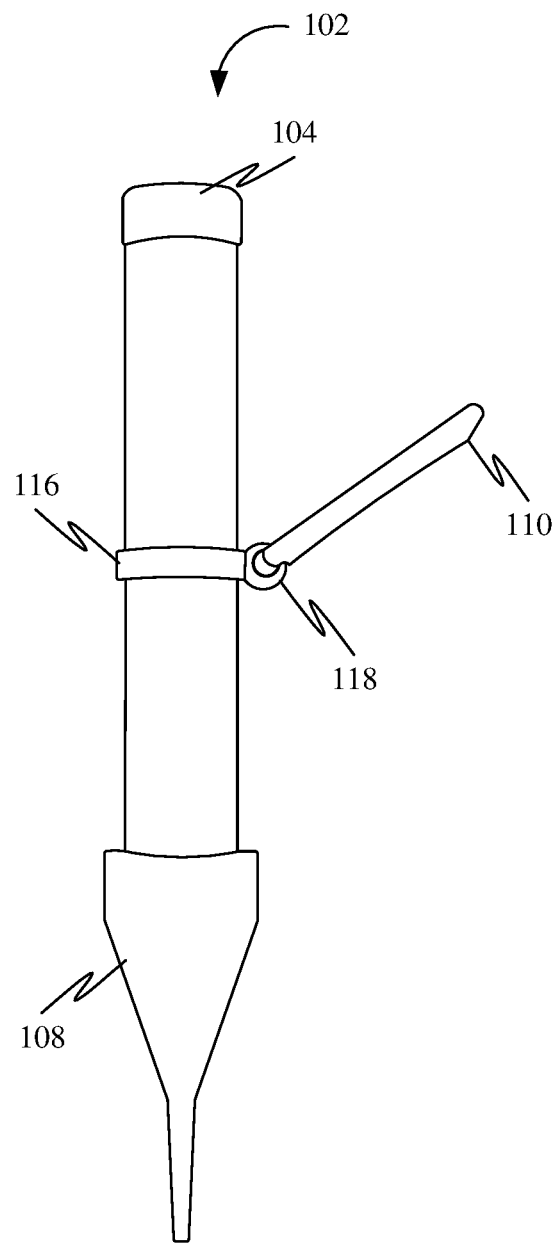
FIG. 3 is a back view of a vertical pole of a light fixture, in accordance with some embodiments.
Figure 4:
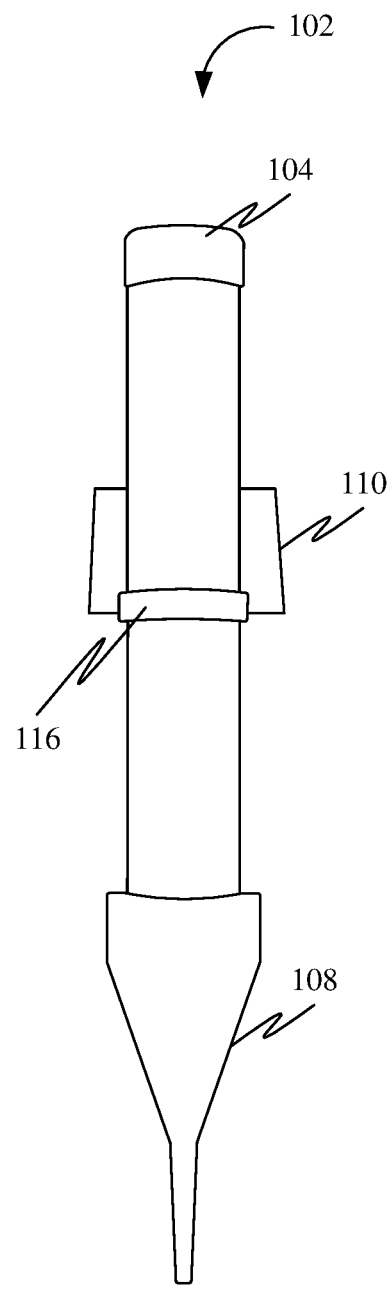
FIG. 4 is a right side view of a vertical pole of a light fixture, in accordance with some embodiments.
Figure 5:
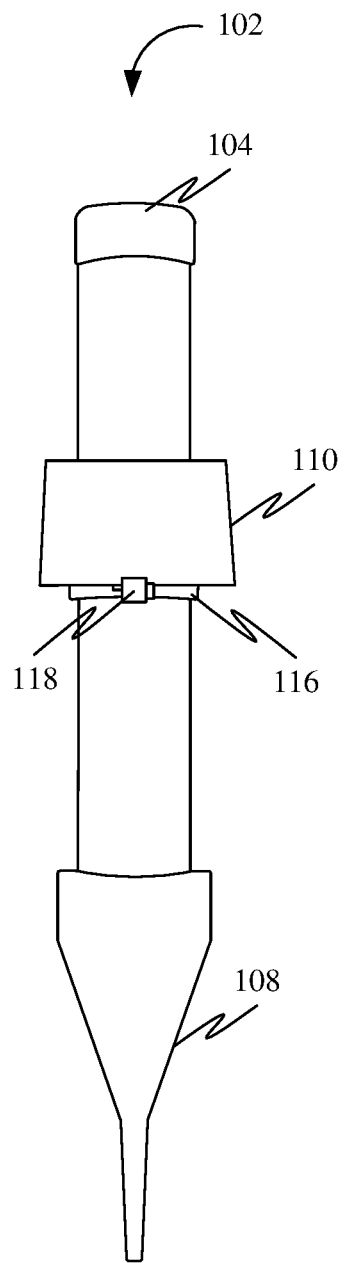
FIG. 5 is a left side view of a vertical pole of a light fixture, in accordance with some embodiments.
Figure 8:
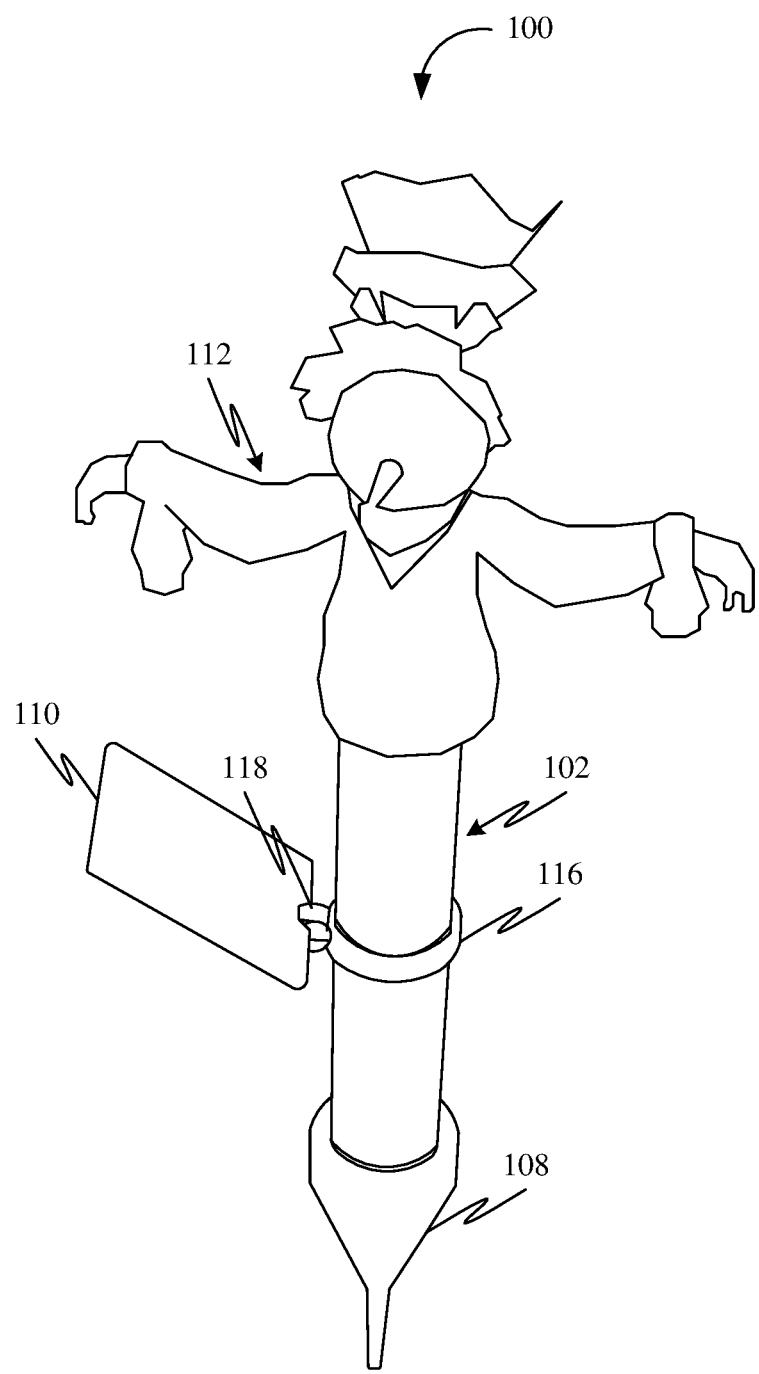
FIG. 8 is a top perspective view of a light fixture, in accordance with some embodiments.

FIG. 2 is a front view of the vertical pole 102 of the light fixture 100. Further, FIG. 3 is a back view of the vertical pole 102 of the light fixture 100. Further, FIG. 4 is a right side view of the vertical pole 102 of the light fixture 100. Further, FIG. 5 is a left side view of the vertical pole 102 of the light fixture 100. Further, FIG. 6 is a top perspective view of the vertical pole 102 of the light fixture 100. Further, FIG. 7 is an exemplary top perspective view of the vertical pole 102 of the light fixture 100. Further, FIG. 8 is a top perspective view of the light fixture 100.

Further, in an exemplary embodiment, a lighting fixture 100 may include a vertical pole 102 having a hollow cylindrical section with a top end 104 and a bottom end 106. Further, the top end 104 of the vertical pole 102 may include inner-hose threads 120 on an inner surface of the vertical pole 102. Further, the bottom end 106 of the vertical pole 102 may be attached to a staking structure 108 for positioning the vertical pole 102 above a ground surface.

Further, the lighting fixture 100 may include a solar panel 110 attached to the vertical pole 102 through a fixing mechanism. Further, the fixing mechanism may include a ring 116 and a holding clamp 118. Further, the holding clamp 118 may be attached to an outer circumference of the ring 116. Further, an inner circumference of the ring 116 may be attached with an outer surface of the vertical pole 102. Further, the ring 116 may be affixed to the vertical pole 102 near the center of the vertical pole 102. Further, the solar panel 110 may be electrically coupled with an energy storage device through a controller. Further, the energy storage device and the controller may be secured within the vertical pole 102. Further, the controller may be configured to allow a flow of electrical energy from the solar panel 110 to the energy storage device when electromagnetic radiation hits the solar panel 110.

Further, the lighting fixture 100 may include at least one Light Emitting Diode (LED) disposed within the hollow cylindrical section of the vertical pole 102. Further, the at least one LED may be electrically coupled with the energy storage device through the controller. Further, the controller may be configured to allow the flow of electrical energy from the energy storage device to the at least one LED when at least one of a voltage and a current produced by the solar panel 110 falls below a predefined level Further, the lighting fixture 100 may include a decorative fixture 112 including a hose connector at a lower end of the decorative fixture 112. Further, the hose connector may be a cylindrical section substantially equal in diameter to that of the hollow cylindrical section of the vertical pole 102. Further, the hose connector may include screw threads 114 on an outer surface of the cylindrical section. Further, the screw threads 114 may be configured to removably connect the decorative fixture 112 with the inner-hose threads 120 of the vertical pole 102.

In further embodiments, the decorative fixture 112 may be a light diffuser which diffuses light rays coming from the at least one LED. Further, the light diffuser, in an instance, may have a light transmission in a range from transparent to translucent.

In further embodiments, a shape of the decorative fixture 112 may correspond to at least one of a shape of a fictional character, a shape of a festival decoration (e.g. Christmas and Halloween decorations), a shape of a seasonal decoration (e.g. spring and summer decorations), and a shape related to a sports team (e.g. a football team).

In further embodiments, the at least one LED may be positioned near the top end 104 of the vertical pole 102.

In further some embodiments, the energy storage device may include at least one of a Lithium-ion battery, a Nickel-Cadmium battery, a Lead-Acid battery, and a Nickel-Metal hydride battery.

In further embodiments, the staking structure 108 may be a generally elongate structure having a pointed end at a first end and a circular end at a second end. Further, the second end may be adapted to engage with the bottom end 106 of the hollow cylindrical section of the vertical pole 102. Further, the first end may be adapted to be driven into the ground surface for positioning the vertical pole 102 above the ground surface.

In further embodiments, the predefined level may be a minimum magnitude of at least one of the voltage and the current that may be required to operate the at least one LED.

Further, in some embodiments, a lighting fixture 100 may include a vertical pole 102 having a hollow cylindrical section with a top end 104 and a bottom end 106. Further, the top end 104 of the vertical pole 102 may include a female camlock connector. Further, the female camlock connector may be configured to removably connect a decorative fixture 112 with the vertical pole 102.

Further, the lighting fixture 100 may include a solar panel 110 attached to the vertical pole through a fixing mechanism. Further, the solar panel 110 may be electrically coupled with an energy storage device through a controller. Further, the controller may be configured to allow a flow of electrical energy from the solar panel 110 to the energy storage device when sunlight hits the solar panel 110.

Further, the lighting fixture may include at least one illuminating device 122 disposed within the hollow cylindrical section of the vertical pole 102. Further, the at least one illuminating device 122 may be electrically coupled with the energy storage device through the controller. Further, the controller may be configured to allow the flow of electrical energy from the energy storage device to the at least one illuminating device 122 at low sunlight levels.

Further, the lighting fixture 100 may include the decorative fixture 112 that may include a male camlock connector at a lower end of the decorative fixture 112. Further, the male camlock connector may be configured to be mechanically coupled with the female camlock connector of the vertical pole 102 in order to attach the decorative fixture 112 to the vertical pole 102.

Further, a first exemplary embodiment is comprised of a yard light (such as the lighting fixture 100), providing a vertical, cylindrical shaft (such as the vertical pole 102) with a spike (such as the staking structure 108) at the bottom end. Preferably, the shaft is 12 inches in length and the spike is 4 inches in length. A solar panel (such as the solar panel 110) is affixed to the center of the shaft by an arm (such as the fixing mechanism). The solar panel charges an internal battery, which in turn powers a low-powered light within the shaft which is activated at sunset and deactivated at sunrise.

An upper end (such as the top end 104) of the shaft provides a threaded camlock fitting (such as the inner-hose threads 120) which allows the attachment of a decorative fixture (such as the decorative fixture 112) with screw threads (such as the screw threads 114), which are provided at the lower end of the decorative fixture. The decorative fixture may be illuminated from within by a low-powered light (such as the at least one illuminating device 122), and may be easily removed and replaced with a different decorative fixture. A broad variety of decorative fixtures may be available such as Christmas and Halloween decorations, seasonal spring and summer decorations, and decorations which show support for a favorite sports team.

Further, to use the first exemplary embodiment, a user may thrust the spike into a ground surface such that the solar panel is directed towards southern sky. The user may then select and affix the decorative fixture to the camlock fitting.

Further, the spike, the shaft, the arm, the camlock fitting, and the decorative fixture may be preferably manufactured from rigid, durable materials which maybe corrosion resistant, such as (but not limited to) steel, brass, plastic, and aluminum alloy. The solar panel may be preferably manufactured from a silicon wafer framed by a rigid, durable material which may be corrosion resistant, such as steel, brass, plastic, or aluminum alloy.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

Although the present disclosure has been explained in relation to its preferred embodiment, it is to be understood that many other possible modifications and variations can be made without departing from the spirit and scope of the disclosure.

What is claimed is:
1. A lighting fixture comprising:
a vertical pole having a hollow cylindrical section with a top end and a bottom end, wherein the top end of the vertical pole comprises inner-hose threads on an inner surface of the vertical pole, wherein the bottom end of the vertical pole is attached to a staking structure for positioning the vertical pole above a ground surface;
a solar panel attached to the vertical pole through a fixing mechanism, wherein the solar panel is electrically coupled with an energy storage device through a controller, wherein the energy storage device and the controller are secured within the vertical pole, wherein the controller is configured to allow a flow of electrical energy from the solar panel to the energy storage device when electromagnetic radiation hits the solar panel;

at least one illuminating device disposed within the hollow cylindrical section of the vertical pole, wherein the at least one illuminating device is electrically coupled with the energy storage device through the controller, wherein the controller is configured to allow the flow of electrical energy from the energy storage device to the at least one illuminating device when at least one of a voltage and a current produced by the solar panel falls below a predefined level; and a decorative fixture comprising a hose connector at a lower end of the decorative fixture, wherein the hose connector is a cylindrical section substantially equal in diameter to that of the hollow cylindrical section of the vertical pole, wherein the hose connector comprises screw threads on an outer surface of the cylindrical section, wherein the screw threads is configured to removably connect the decorative fixture with the inner-hose threads of the vertical pole.

2. The lighting fixture of claim 1, wherein the decorative fixture is a light diffuser which diffuses light rays coming from the at least one illuminating device.

3. The lighting fixture of claim 1, wherein a shape of the decorative fixture corresponds to at least one of a shape of a fictional character, a shape of a festival decoration, a shape of a seasonal decoration, and a shape related to a sports team.

4. The lighting fixture of claim 1, wherein the at least one illuminating device comprises at least one of a Light Emitting Device (LED), a fluorescent lamp, a compact fluorescent lamp, a sodium lamp, and an incandescent light bulb.

5. The lighting fixture of claim 1, wherein the at least one illuminating device is positioned near the top end of the vertical pole.

6. The lighting fixture of claim 1, wherein the fixing mechanism comprises a ring and a holding clamp, wherein the holding clamp is attached to an outer circumference of the ring, wherein an inner circumference of the ring is attached with an outer surface of the vertical pole.

7. The lighting fixture of claim 6, wherein the ring is affixed to the vertical pole near the center of the vertical pole.

8. The lighting fixture of claim 1, wherein the energy storage device comprises at least one of a Lithium-ion battery, a Nickel-Cadmium battery, a Lead-Acid battery, and a Nickel-Metal hydride battery.

9. The lighting fixture of claim 1, wherein the vertical pole is 12 inches in length and the staking structure is 4 inches in length.

10. The lighting fixture of claim 1, wherein each of the vertical pole, the staking structure, the fixing mechanism, and the decorative fixture is manufactured from at least one of a steel, a brass, a plastic, and an aluminum alloy.

11. The lighting fixture of claim 1, wherein the solar panel is manufactured from a silicon wafer framed by a rigid material, wherein the rigid material comprises at least one of a steel, a brass, a plastic, and an aluminum alloy.

12. The lighting fixture of claim 1, wherein the staking structure is a generally elongate structure having a pointed end at a first end and a circular end at a second end, wherein the second end is adapted to engage with the bottom end of the hollow cylindrical section of the vertical pole, wherein the first end is adapted to be driven into the ground surface for positioning the vertical pole above the ground surface.

13. The lighting fixture of claim 1, wherein the predefined level is a minimum magnitude of at least one of the voltage and the current that is required to operate the at least one illuminating device.

14. A lighting fixture comprising:

a vertical pole having a hollow cylindrical section with a top end and a bottom end, wherein the top end of the vertical pole comprises inner-hose threads on an inner surface of the vertical pole, wherein the bottom end of the vertical pole is attached to a staking structure for positioning the vertical pole above a ground surface;

a solar panel attached to the vertical pole through a fixing mechanism, wherein the fixing mechanism comprises a ring and a holding clamp, wherein the holding clamp is attached to an outer circumference of the ring, wherein an inner circumference of the ring is attached with an outer surface of the vertical pole, wherein the ring is affixed to the vertical pole near the center of the vertical pole, wherein the solar panel is electrically coupled with an energy storage device through a controller, wherein the energy storage device and the controller are secured within the vertical pole, wherein the controller is configured to allow a flow of electrical energy from the solar panel to the energy storage device when electromagnetic radiation hits the solar panel;

at least one Light Emitting Diode (LED) disposed within the hollow cylindrical section of the vertical pole, wherein the at least one LED is electrically coupled with the energy storage device through the controller, wherein the controller is configured to allow the flow of electrical energy from the energy storage device to the at least one LED when at least one of a voltage and a current produced by the solar panel falls below a predefined level; and a decorative fixture comprising a hose connector at a lower end of the decorative fixture, wherein the hose connector is a cylindrical section substantially equal in diameter to that of the hollow cylindrical section of the vertical pole, wherein the hose connector comprises screw threads on an outer surface of the cylindrical section, wherein the screw threads is configured to removably connect the decorative fixture with the inner-hose threads of the vertical pole.

15. The lighting fixture of claim 14, wherein the decorative fixture is a light diffuser which diffuses light rays coming from the at least one LED.

16. The lighting fixture of claim 14, wherein a shape of the decorative fixture corresponds to at least one of a shape of a fictional character, a shape of a festival decoration, a shape of a seasonal decoration, and a shape related to a sports team.

17. The lighting fixture of claim 14, wherein the at least one LED is positioned near the top end of the vertical pole.

18. The lighting fixture of claim 14, wherein the energy storage device comprises at least one of a Lithium-ion battery, a Nickel-Cadmium battery, a Lead-Acid battery, and a Nickel-Metal hydride battery.

19. The lighting fixture of claim 14, wherein the staking structure is a generally elongate structure having a pointed end at a first end and a circular end at a second end, wherein the second end is adapted to engage with the bottom end of the hollow cylindrical section of the vertical pole, wherein the first end is adapted to be driven into the ground surface for positioning the vertical pole above the ground surface.

20. The lighting fixture of claim 14, wherein the predefined level is a minimum magnitude of at least one of the voltage and the current that is required to operate the at least one LED.

\* \* \* \* \*